(12) United States Patent
Xu et al.

(10) Patent No.: US 12,336,019 B2
(45) Date of Patent: Jun. 17, 2025

(54) RANDOM ACCESS PREAMBLE CONFIGURATION METHOD APPLICABLE TO SATELLITE NETWORK, AND APPARATUS

(71) Applicant: HUAWEI TECHNOLOGIES CO., LTD., Shenzhen (CN)

(72) Inventors: Chenlei Xu, Hangzhou (CN); Jianwei Zhou, Hangzhou (CN); Xiaolu Wang, Hangzhou (CN); Hejia Luo, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 326 days.

(21) Appl. No.: 17/738,461

(22) Filed: May 6, 2022

(65) Prior Publication Data

US 2022/0264662 A1  Aug. 18, 2022

Related U.S. Application Data

(63) Continuation of application No. PCT/CN2020/125500, filed on Oct. 30, 2020.

(30) Foreign Application Priority Data

Nov. 7, 2019 (CN) .................. 201911083847.X

(51) Int. Cl.
*H04W 74/0833* (2024.01)
*H04L 27/26* (2006.01)
(Continued)

(52) U.S. Cl.
CPC ..... *H04W 74/0841* (2013.01); *H04L 27/2607* (2013.01); *H04W 72/0446* (2013.01); *H04W 74/0866* (2013.01); *H04W 84/06* (2013.01)

(58) Field of Classification Search
CPC ......... H04W 74/0841; H04W 72/0446; H04W 74/0866; H04L 27/2607
See application file for complete search history.

(56) References Cited

U.S. PATENT DOCUMENTS

2018/0279381 A1* 9/2018 Tabet ................ H04W 74/0833
2020/0015266 A1* 1/2020 Yan .................... H04W 74/0833
(Continued)

FOREIGN PATENT DOCUMENTS

| CN | 102917468 A | 2/2013 |
|---|---|---|
| CN | 107360629 A | 11/2017 |

(Continued)

OTHER PUBLICATIONS

Ericsson:"On NTN synchronization, random access, and timingadvance", 3GPP Draft; R1-1910982 On NTN Synchronization, Random Access, and Timing Advance, 3rd Generationpartnership Project (3GPP), vol. RAN WG1 No. Chongqing, China;Oct. 14, 2019 Oct. 20, 2019 Oct. 5, 2019 (Oct. 5, 2019), XP051808776.

(Continued)

*Primary Examiner* — Won Tae C Kim
(74) *Attorney, Agent, or Firm* — HAUPTMAN HAM, LLP

(57) ABSTRACT

This application discloses a random access preamble configuration method applicable to a satellite network and a communication apparatus. In the method, a random access preamble location offset and duration of a PRACH occasion can be flexibly configured based on features of a satellite system. The method includes: A receiving apparatus receives first indication information, where the first indication information includes indication information used to identify the random access preamble location offset at the physical random access channel PRACH occasion. The receiving apparatus transmits a random preamble based on the first indication information, where the random preamble (Continued)

includes a sequence part and a guard time. Because a communication distance is relatively long and a transmission delay difference between users is relatively large in a satellite communication system, time domain resources occupied by the PRACH occasion can be minimized by using this method.

18 Claims, 7 Drawing Sheets

(51) Int. Cl.
*H04W 72/0446* (2023.01)
*H04W 74/08* (2024.01)
*H04W 84/06* (2009.01)

(56) References Cited

U.S. PATENT DOCUMENTS

| | | | | |
|---|---|---|---|---|
| 2020/0413451 | A1* | 12/2020 | Taherzadeh Boroujeni | H04W 56/005 |
| 2021/0120593 | A1* | 4/2021 | Carlsson | H04L 5/0053 |
| 2022/0046715 | A1* | 2/2022 | Maeder | H04W 74/02 |
| 2022/0338272 | A1* | 10/2022 | Ohara | H04W 72/0446 |
| 2022/0361248 | A1* | 11/2022 | Takahashi | H04L 5/14 |

FOREIGN PATENT DOCUMENTS

| | | |
|---|---|---|
| CN | 108696938 A | 10/2018 |
| CN | 110268777 A | 9/2019 |
| EP | 3471363 A1 | 4/2019 |
| WO | 2014166046 A1 | 10/2014 |
| WO | 2018083662 A1 | 5/2018 |
| WO | 2018129123 A1 | 7/2018 |
| WO | 2019161044 A1 | 8/2019 |

OTHER PUBLICATIONS

Interdigital Inc: "Considerations on Random Access for Non-Terrestrial Networks",3GPP Draft; R1-1802632 Considerations on Random Accessfor Non-Terrestrial Networks, 3rd Generationpartnership Project (3GPP), vol. RAN WG1 No. Atehns, Greece;Feb. 26, 2018 Mar. 2, 2018 Feb. 17, 2018 (Feb. 17, 2018), XP051398070.
Extended European Search Report issued in corresponding European Application No. 20884540.4, dated Nov. 7, 2022 pp. 1-13.
3GPP TS 38.211 V15.7.0 (Sep. 2019); 3rd Generation Partnership Project; Technical Specification Group Radio Access Network;NR;Physical channels and modulation(Release 15), total 97 pages.
International Search Report issued in corresponding International Application No. PCT/CN2020/125500, dated Jan. 27, 2021, pp. 1-9.
Chinese Office Action issued in corresponding Chinese Application No. 201911083847.X, dated May 6, 2022, pp. 1-8.

* cited by examiner

RANDOM ACCESS PREAMBLE CONFIGURATION METHOD APPLICABLE TO SATELLITE NETWORK, AND APPARATUS

CROSS-REFERENCE TO RELATED APPLICATIONS

This application is a continuation of International Application No. PCT/CN2020/125500, filed on Oct. 30, 2020, which claims priority to Chinese Patent Application No. 201911083847.X, filed on Nov. 7, 2019. The disclosures of the aforementioned applications are hereby incorporated by reference in their entireties.

TECHNICAL FIELD

Embodiments of this application relate to the field of communication technologies, and in particular, to a random access preamble configuration method applicable to a satellite network and an apparatus.

BACKGROUND

Satellite communication has prominent advantages such as global coverage, long-distance transmission, flexible networking, easy deployment, and no geographical restriction. The satellite communication has been widely used in many fields, such as maritime communication, positioning and navigation, disaster relief, scientific experiment, video broadcasting, and earth observation. A future communication network, for example, 5G, and an evolved network thereof not only need to meet a plurality of service requirements, but also need to provide wider service coverage. Therefore, compared with terrestrial cellular communication, the satellite communication has great advantages and a broad application prospect.

In the satellite communication, especially in a non-geostationary satellite orbit (Non-Geostationary Earth Orbit, NGEO) satellite, satellites may be classified into low earth orbit (Low Earth Orbit, LEO) satellites and medium earth orbit (Medium Earth Orbit, MEO) satellites based on orbit heights of the satellites. If satellite systems are classified based on an on-board processing capability, the satellite communication systems can be classified into transparent (transparent) satellite systems and regenerative (regenerative) satellite systems. In the transparent satellite system, a satellite transparently transmits only a signal and shifts a spectrum, and does not process information. A ground station is responsible for specific information processing. In the regenerative satellite system, a satellite has an on-board signal processing capability. The satellite can extract an original baseband signal and use information for routing, switching and system configuration. At present, the transparent satellite system and the regenerative satellite system coexist and are developed together.

A satellite communication system mainly differs from a ground communication system in that there is a large signal transmission delay between a terminal and a satellite (network device side). According to another aspect, in a random access procedure, the satellite estimates an uplink timing location by detecting a random access preamble sent by the terminal, and indicates an initial timing advance (Timing Advance, TA) value to the terminal. A cyclic prefix part in the random access preamble sent by the terminal needs to cover at least a maximum round-trip transmission delay range. Because a transmission delay between the terminal and the satellite of the satellite communication system is much larger than that of the ground communication system, a random access preamble format defined in an existing protocol fails to function in some satellite communication scenarios. Therefore, a random access preamble applicable to a satellite communication scenario, and a method for configuring an added preamble format urgently need to be introduced.

SUMMARY

To resolve a problem that a transmission delay difference between different users in a satellite communication system is relatively large, embodiments of this application provide a random access preamble configuration method applicable to a satellite network. The method can reduce time domain resources occupied by a random access preamble at a PRACH occasion. In addition, a preamble format indication may be compatible with an existing protocol, thereby reducing signaling overheads and ensuring signaling configuration flexibility.

Specific technical solutions provided in this application are as follows: According to a first aspect, a random access preamble configuration method applicable to a satellite network is provided. The method may be performed by a ground communication device, for example, a handheld satellite phone, or a terminal that communicates through the satellite network. The method includes: A receiving apparatus receives first indication information, where the first indication information includes indication information used to identify a random access preamble location offset at a physical random access channel PRACH occasion. The receiving apparatus transmits a random preamble based on the first indication information, where the random preamble includes a sequence part and a guard time.

According to a second aspect, this application further provides a random access preamble configuration method applicable to a satellite network. The method may be performed by an operator of the satellite network. The method includes: A sending apparatus sends first indication information, where the first indication information includes indication information used to identify a random access preamble location offset at a physical random access channel PRACH occasion. A receiving apparatus receives the first indication information sent by the sending apparatus. The receiving apparatus transmits a random preamble sequence based on the first indication information, where the random preamble sequence includes a sequence part and a guard time. The sending apparatus receives the random preamble sequence transmitted by the receiving apparatus.

According to a third aspect, this application further provides another random access preamble configuration method applicable to a satellite network. The method may be performed by a satellite, for example, an LEO satellite, an MEO satellite, or in some cases, a high altitude communication platform. The method includes: A sending apparatus sends first indication information, where the first indication information includes indication information used to identify a random access preamble location offset at a physical random access channel PRACH occasion. The sending apparatus receives a random preamble sequence transmitted by a receiving apparatus, where the random preamble sequence includes a sequence part and a guard time.

In some implementations, the method further includes: The first indication information further includes at least one first sequence number, where the first sequence number is used to indicate random access configuration information associated with a random access preamble without a cyclic prefix. The receiving apparatus determines format information of the random access preamble without the cyclic prefix based on the random access configuration information.

In some implementations, the method further includes: The first indication information further includes indication information used to identify a quantity of repeated symbols included in the sequence part; or the receiving apparatus receives second indication information, where the second indication information includes indication information used to identify a quantity of repeated symbols included in the sequence part.

In some implementations, the method further includes: The receiving apparatus determines the random access preamble location offset at the PRACH occasion based on the random access configuration information.

In some implementations, the indication information used to identify the random access preamble location offset at the physical random access channel PRACH occasion includes an index of a start subframe, a start slot, and/or a start symbol in which the random access preamble is placed at the PRACH occasion, where the index of the start subframe, the start slot, or the start symbol is a relative index different from an index of a start subframe, a start slot, or a start symbol of a communication system, or an absolute index the same as an index of a start subframe, a start slot, or a start symbol of a communication system.

In some implementations, the indication information used to identify the random access preamble location offset at the physical random access channel PRACH occasion includes indication information of duration of the PRACH occasion, and the receiving apparatus derives the random access preamble location offset based on the duration, where the duration includes at least one of the following: a quantity of duration subframes, a quantity of duration slots, or a quantity of duration symbols of the PRACH occasion.

In some implementations, the indication information used to identify the random access preamble location offset at the physical random access channel PRACH occasion includes parameter information of the satellite network, and the receiving apparatus derives the random access preamble location offset based on the parameter information, where a parameter of the satellite network includes at least one of the following: a maximum round-trip transmission delay difference between users in a satellite cell (or a satellite beam), an angle of the satellite beam, or a radius of the satellite beam.

In some implementations, the receiving apparatus receives the first indication information or the second indication information in any one of the following manners: a broadcast message, a radio resource control RRC message, downlink control information DCI, or a media access control MAC message.

According to a fourth aspect, this application further provides a communication apparatus. The apparatus may be a terminal device (for example, a satellite phone or a satellite communication device), an apparatus in a terminal device (for example, a chip, a chip system, or a circuit), or an apparatus that can be used together with a terminal device. In a design, the apparatus may include modules that are in a one-to-one correspondence with the methods/operations/ steps/actions described in the first aspect. The modules may be implemented by a hardware circuit, software, or a combination of a hardware circuit and software. In a design, the apparatus may include a receiving unit, configured to receive first indication information, where the first indication information includes indication information used to identify a random access preamble location offset at a physical random access channel PRACH occasion; a processing unit, configured to output a random preamble based on the first indication information, where the random preamble includes a sequence part and a guard time; and a transmitting unit, configured to transmit the random preamble.

According to a fifth aspect, a communication apparatus is provided, and the apparatus may be a network device (for example, an LEO satellite, an MEO satellite, or a high altitude communication platform), an apparatus located in a network device (for example, a chip, a chip system, or a circuit), or an apparatus that can be used together with a network device. In a design, the apparatus may include modules that are in a one-to-one correspondence with the methods/operations/steps/actions described in the second aspect. The modules may be implemented by a hardware circuit, software, or a combination of a hardware circuit and software. In a design, the apparatus includes a sending unit, configured to send first indication information, where the first indication information includes indication information used to identify a random access preamble location offset at a physical random access channel PRACH occasion; and a receiving unit, configured to receive a random preamble sequence transmitted by a receiving apparatus, where the random preamble sequence includes a sequence part and a guard time.

In some implementations, the first indication information further includes at least one first sequence number, where the first sequence number is used to indicate random access configuration information associated with a random access preamble without a cyclic prefix. A processing unit determines format information of the random access preamble without the cyclic prefix based on the random access configuration information.

In some implementations, the first indication information further includes indication information used to identify a quantity of repeated symbols included in the sequence part; or the receiving unit is further configured to receive second indication information, where the second indication information includes indication information used to identify a quantity of repeated symbols included in the sequence part.

In some implementations, the processing unit determines the random access preamble location offset at the PRACH occasion based on the random access configuration information.

In some implementations, the indication information used to identify the random access preamble location offset at the physical random access channel PRACH occasion includes at least one of the following: an index of a start subframe, a start slot, or a start symbol in which the random access preamble is placed at the PRACH occasion, where the index of the start subframe, the start slot, or the start symbol is a relative index different from an index of a start subframe, a start slot, or a start symbol of a communication system, or an absolute index the same as an index of a start subframe, a start slot, or a start symbol of a communication system.

In some implementations, the indication information used to identify the random access preamble location offset at the physical random access channel PRACH occasion includes indication information of duration of the PRACH occasion, and the processing unit derives the random access preamble location offset based on the duration, where the duration includes at least one of the following: a quantity of duration subframes, a quantity of duration slots, or a quantity of duration symbols of the PRACH occasion.

In some implementations, the indication information used to identify the random access preamble location offset at the physical random access channel PRACH occasion includes parameter information of the satellite network, and the processing unit derives the random access preamble location offset based on the parameter information, where a parameter of the satellite network includes at least one of the following: a maximum round-trip transmission delay difference between users in a satellite cell (or a satellite beam), an angle of the satellite beam, or a radius of the satellite beam.

In some implementations, the receiving unit receives the first indication information or the second indication information in any one of the following manners: a broadcast message, a radio resource control RRC message, downlink control information DCI, or a media access control MAC message.

According to a sixth aspect, this application provides a communication apparatus. The communication apparatus may be the receiving apparatus in the foregoing method, for example, a terminal or a chip disposed in a terminal, or may be the sending apparatus in the foregoing method, for example, a satellite or a chip disposed in a satellite. The communication apparatus includes a processor and a memory, and optionally, further includes a transceiver. The processor is electrically coupled to the memory. The memory is configured to store computer program instructions. The processor is configured to execute some or all of the computer program instructions in the memory, and when the some or all of the computer program instructions are executed, the method according to any one of the first aspect and the possible implementations of the first aspect is performed, or the method according to any one of the third aspect and the possible implementations of the third aspect is performed. In a possible design, a chip system further includes a transceiver, and the transceiver is configured to send a signal processed by the processor, or receive a signal and input the signal to the processor. The chip system in the communication apparatus may include a chip, or may include a chip and another discrete component.

According to a seventh aspect, a computer program product is provided. The computer program product includes computer program code, and when the computer program code is run on a computer, the computer is enabled to perform the method according to any one of the first aspect and the possible implementations of the first aspect, or perform the method according to any one of the third aspect and the possible implementations of the third aspect.

According to an eighth aspect, a computer-readable storage medium is provided. The computer-readable storage medium stores a computer program, and when the computer program is run, the method according to any one of the first aspect and the possible implementations of the first aspect is implemented, or the method according to any one of the third aspect and the possible implementations of the third aspect is implemented.

According to a ninth aspect, a satellite communication system is provided. The system may include an apparatus for performing the method according to any one of the first aspect and the possible implementations of the first aspect, and an apparatus for performing the method according to any one of the third aspect and the possible implementations of the third aspect.

DESCRIPTION OF EMBODIMENTS

Figure 1:
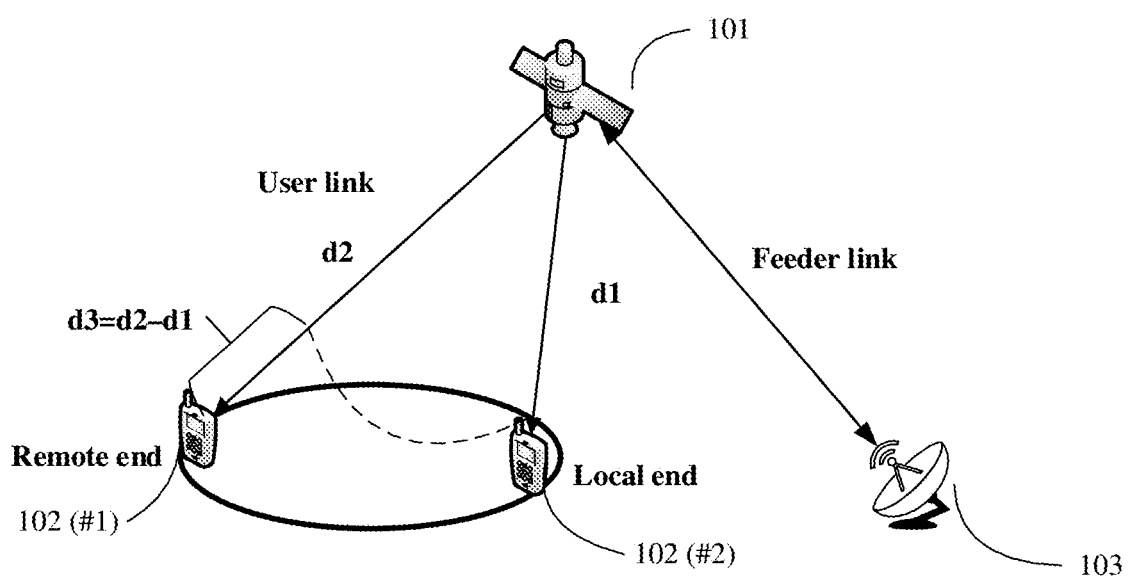
FIG. 1 is a possible schematic architectural diagram of a mobile satellite communication system applicable to this application.

The following describes in detail embodiments of this application with reference to the accompanying drawings.

To help a reader understand the embodiments of this application, some terms used in the embodiments of this application are first explained and described. It may be understood that the following terms are used to help the reader better understand application scenarios and technical solutions of this application, so that the reader can quickly understand technical features in the solutions by using the terms. The interpretation of the terms does not constitute an absolute limitation on the technical features.

(1) A terminal is also referred to as a terminal device, user equipment (user equipment, UE), a mobile station (mobile station, MS), a mobile terminal (mobile terminal, MT), or the like, and is a device that provides voice and/or data connectivity for a user. For example, the terminal device includes a handheld device, a vehicle-mounted device, an Internet-of-Things device, or the like that has a wireless connection function. Currently, the terminal device may be a mobile phone (mobile phone), a tablet computer, a notebook computer, a palmtop computer, a mobile Internet device (mobile Internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. Alternatively, the terminal device may be a terminal device in a 5G network, a terminal device in a future evolved public land mobile network (Public Land Mobile Network, PLMN) or another future communication system, or the like.

(2) A network device, also referred to as a network side device, is a device configured to communicate with a terminal device. The network device may be a base station, or may be an evolved NodeB (evolved NodeB, eNB, or eNodeB) in an LTE system. Alternatively, the network device may be a radio controller in a cloud radio access network (cloud radio access network, CRAN) scenario, or the network device may be a relay station, an access point, a vehicle-mounted device, a next generation NodeB (next generation NodeB, gNodeB) in a 5G network, or the like. The network device mentioned in the embodiments of this application mainly refers to a satellite, or is referred to as a satellite base station. Certainly, the network device may alternatively be a ground station in a satellite network. In this satellite network scenario, a satellite performs only a transparent forwarding function. The network device mainly provides a radio access service for the terminal device, schedules a radio resource to the terminal device that performs access, and provides a reliable radio transmission protocol, a data encryption protocol, and the like. The satellite base station may also refer to a base station that uses an artificial earth satellite, a high altitude aircraft, or the like for wireless communication. The satellite base station may be a geostationary earth orbit (geostationary earth orbit, GEO) satellite, may be a medium earth orbit (medium earth orbit, MEO) satellite and a low earth orbit (low earth orbit, LEO) satellite in a non-geostationary earth orbit (nonegeostationary earth orbit, NGEO), may be a high altitude platform station (High Altitude Platform Station, HAPS), or the like.

(3) A core network device is mainly used for user access control, charging, mobility management, session management, user security authentication, a supplementary service, and the like. In the embodiments of this application, the core network device mainly includes a user plane function unit, an access and mobility management function unit, a session management function unit, and a data network. The core network device includes a plurality of function units, and the units may be classified as control plane function entities and data plane function entities. The access and mobility management function (AMF, Access and mobility function) unit is a control plane function entity, and is responsible for user access management, security authentication, and mobility management. The session management function (SMF, Session Management Function) unit is a control plane function entity, is responsible for session management, and is connected to the AMF. The user plane function (UPF, User Plane Function) unit is a data plane function entity, and is responsible for functions such as user plane data transmission management, traffic statistics collection. The data network is a data plane function entity, and is connected to the UPF. The core network device further includes other function units, but the function units are not listed one by one.

(4) A beam is a shape formed on the surface of the earth by an electromagnetic wave emitted from a satellite antenna, and is like a beam of a flashlight that has a specific range. The shape of the beam is determined by a transmit antenna. Alternatively, a signal emitted by the satellite is not 360 degrees of radiation, but is a signal wave emitted in a specific direction in a concentrated manner. One satellite cell includes at least one satellite beam. In some cases, one satellite beam or a set of a plurality of satellite beams may also be considered as a concept of one cell.

(5) Ephemeris information: in GPS measurement, an ephemeris is a table of a precise location or track of a satellite that changes over time as the satellite runs, and is a time function. A satellite ephemeris may determine a running status of a flying body such as time, a location, and a speed.

The term "and/or" in this application describes an association relationship between associated objects and represents that three relationships may exist. For example, A and/or B may represent the following three cases: Only A exists, both A and B exist, and only B exists. The character "/" generally represents an "or" relationship between the associated objects.

"A plurality of" in this application means two or more.

In the descriptions of this application, terms such as "first" and "second" are merely used for distinction and description, and should not be understood as an indication or implication of relative importance or an indication or implication of an order.

In addition, the term "for example" in the embodiments of this application is used to represent giving an example, an illustration, or a description. Any embodiment or implementation solution described as an "example" in this application should not be explained as being more preferred or having more advantages than another embodiment or implementation solution. Exactly, the term "example" is used to present a concept in a specific manner.

Embodiments of this application provide a random access preamble configuration method applicable to a satellite network and a communication apparatus. The method and the apparatus are based on a same technical concept. Because problem solving principles of the method and the apparatus are similar, mutual reference may be made to implementations of the apparatus and the method, and repeated parts are not described again.

The technical solutions in the embodiments of this application may be applied to various communication systems, for example, a satellite communication system. The satellite communication system may be integrated with a conventional mobile communication system. For example, the mobile communication system may be a 4th generation (4th Generation, 4G) communication system (for example, a long term evolution (long term evolution, LTE) system), a worldwide interoperability for microwave access (worldwide interoperability for microwave access, WiMAX) communication system, a 5th generation (5th Generation, 5G) communication system (for example, a new radio (new radio, NR) system), a future mobile communication system, and the like.

For example, FIG. 1 is a possible schematic architectural diagram of a mobile satellite communication system applicable to this application. If a satellite communication system is compared with a ground communication system, a satellite or a ground station may be considered as one or more ground network devices, for example, base stations. In this application, the satellite is also referred to as a satellite base station, and meanings of the satellite and the satellite base station are not distinguished. The satellite provides a communication service for a mobile terminal, and the satellite may further be connected to a core network device (for example, an AMF). In this scenario, the satellite may be a non-geostationary orbit satellite or a geostationary orbit satellite. As shown in FIG. 1, a satellite system 100 mainly includes a satellite 101, a terminal device 102 (the figure shows a remote end terminal device #1 and a local end terminal device #2 in a satellite cell based on a distance between the terminal and the satellite 101), a ground station 103, and a core network device 104 (the core network device further includes a user plane function UPF unit and an access and mobility management AMF unit, which are not shown in the figure). For the satellite communication system shown in FIG. 1, a round-trip transmission delay between the terminal and a network side is divided into two parts: one part is a common round-trip transmission delay of a group of terminals (a common round-trip transmission delay of regenerative satellites is 2xd1/c, and a common round-trip transmission delay of transparent satellites is 2x(d1+feeder link distance)/c, where c is the speed of light), and the other part is a terminal-specific round-trip transmission delay (2xd3/c). The terminal-specific round-trip transmission delay is equal to a difference between a total round-trip transmission delay of a terminal and a common round-trip transmission delay. A terminal-specific round-trip transmission delay of a local user is 0, and a terminal-specific round-trip transmission delay of a remote user is maximum. When sending a random access preamble, the terminal can obtain, by using common round-trip transmission delay information, a pre-compensation timing advance value for transmitting the preamble sequence. In this way, a cyclic prefix length of the random access preamble only needs to be greater than or equal to all terminal-specific round-trip transmission delays in a coverage area, that is, greater than or equal to a maximum round-trip transmission delay difference between users (that is, a round-trip transmission delay of a remote user—a round-trip transmission delay of a local user).

For ease of understanding the embodiments of this application, the following describes an application scenario of this application. A service scenario described in the embodiments of this application is intended to describe the technical solutions in the embodiments of this application more clearly, and does not constitute a limitation on the technical solutions provided in the embodiments of this application. A person of ordinary skill in the art may know that, as a new service scenario emerges, the technical solutions provided in the embodiments of this application are also applicable to a similar technical problem.

Figure 2:
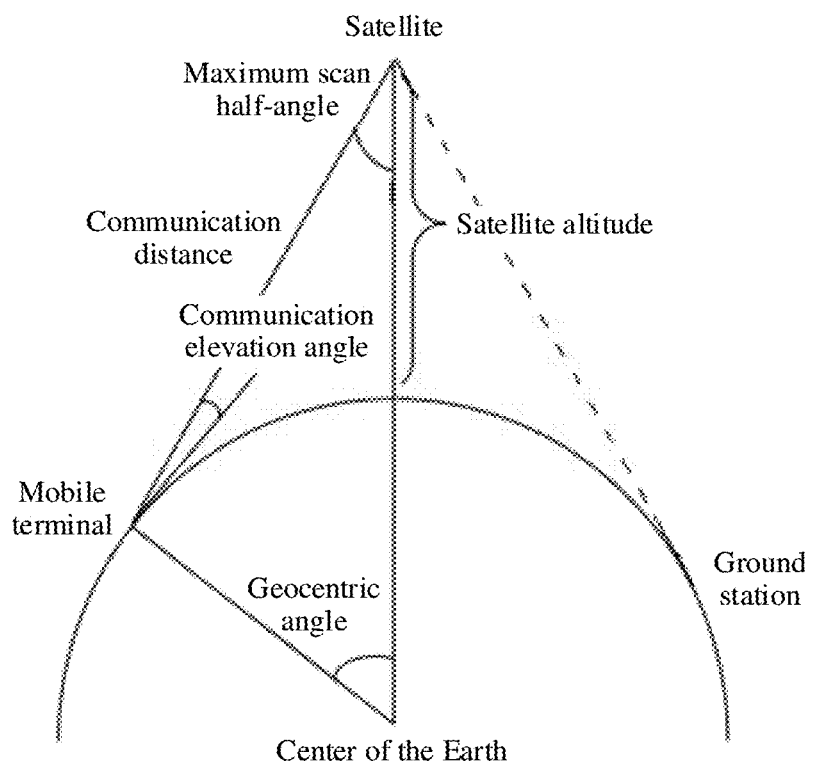
FIG. 2 is an application scenario to which an embodiment of this application is applicable.

An application scenario to which an embodiment of this application is applicable is shown in FIG. 2. In FIG. 2, a satellite may have a signal processing capability, or the satellite may transparently forward a user signal to a ground station to implement wide coverage. A satellite communication system in the figure may use a protocol stack compatible with existing LTE/NR. User equipment is an ordinary mobile terminal or a dedicated terminal, and a transmission process also complies with an LTE/NR protocol. According to a 3GPP conference document, when an orbit height of a regenerative satellite system is 600 km (a satellite has a signal processing capability), and a diameter of a sub-satellite point beam is 90 km, maximum round-trip transmission delay differences between users in the beam under beam conditions with different elevation angles are shown in Table 1.

TABLE 1

Maximum round-trip transmission delay differences between users under beam conditions with different elevation angles

| User elevation angle | 90° | 45° | 30° |
|---|---|---|---|
| Maximum round-trip transmission delay difference (ms) | 0.013098 | 0.85152 | 1.9914 |

Maximum cyclic prefix duration of a random access preamble format defined in the NR protocol is 0.684 ms, that is, a maximum round-trip transmission delay (difference) that can be covered by a preamble sequence defined in the NR protocol is 0.684 ms. Therefore, in a satellite scenario in which the round-trip transmission delay difference exceeds 0.684 ms (for example, the scenario in which the user elevation angle is 45°/30° in Table 1), a preamble format defined in an existing protocol cannot be used to determine an uplink timing location.

In another aspect, in some satellite scenarios, a maximum round-trip transmission delay difference is greater than one preamble symbol (the longest preamble symbol defined in the NR protocol is 0.8 ms). By using a cyclic prefix and a classical detection algorithm, a network side can only estimate uplink timing of less than one preamble symbol. The cyclic prefix has no obvious effect on the scenario in which the maximum round-trip delay difference is greater than one preamble symbol.

It can be learned from the foregoing analysis that, in the satellite communication system, a maximum round-trip transmission delay difference between users in a same satellite cell or satellite beam is relatively large, and the preamble format specified in the existing protocol is difficult to be reused in a satellite scenario. When the maximum round-trip transmission delay difference is greater than one random access preamble symbol, a cyclic prefix part in a random access preamble format has no obvious effect. Therefore, a feasible solution is to introduce a new random access preamble and a corresponding detection method in a satellite communication scenario.

Figure 3:
FIG. 3 is a format of a random access preamble without a cyclic prefix that is applicable to this application.

This application provides a random access preamble without a cyclic prefix and a configuration method thereof. A format of the random access preamble without the cyclic prefix is shown in FIG. 3. The preamble format shown in the figure includes two parts in time domain: a sequence part (Sequence) and a guard time (Guard Time, GT). The sequence part may be generated by using a ZC (Zadoff-Chu) sequence, and the sequence part includes several preamble symbols. Preferably, the sequence part may include a quantity of preamble symbols greater than or equal to a preset value. Certainly, in some cases, the preamble symbols included in the sequence part should be less than a specific value, and the guard time is used to prevent interference between a preamble sequence and data to be subsequently transmitted. The two parts should meet a design requirement of $T_{SEQ} \geq T_{GT} \geq RTD$. $T_{SEQ}$ represents duration of the sequence part, $T_{GT}$ represents duration of the guard time part, and RTD represents a round-trip transmission delay between a terminal and a network side. It should be noted that the random access preamble may also be referred to as a random access preamble sequence. The two terms are not distinguished in this application, but the random access preamble sequence should not be confused with the foregoing sequence (Sequence) part. The random access preamble format is suitable for use in the satellite communication system, because most channels in a satellite communication scenario include direct paths, and such channels have fewer multipaths and a relatively small delay spread. Therefore, a function of resisting the delay spread by using the cyclic prefix has no obvious effect. When a maximum round-trip transmission delay difference in a satellite cell (or a satellite beam) exceeds one preamble symbol, the cyclic prefix has no obvious effect on uplink timing detection. In another aspect, when the terminal sends the random access preamble without the cyclic prefix, the network side may detect, by using a receiver algorithm, an uplink timing location exceeding a length of one random access preamble symbol.

This application provides a detection method of a random access preamble without a cyclic prefix. The algorithm is applied to a network side device, for example, a satellite, a high altitude communication device, or a ground station. When the terminal sends a random access preamble sequence without a cyclic prefix and whose sequence part includes repeated symbols, the network side device may obtain, by using a frequency domain enhanced receiving method described below, an uplink timing location not exceeding a length of the sequence part of the preamble sequence.

Figure 4:
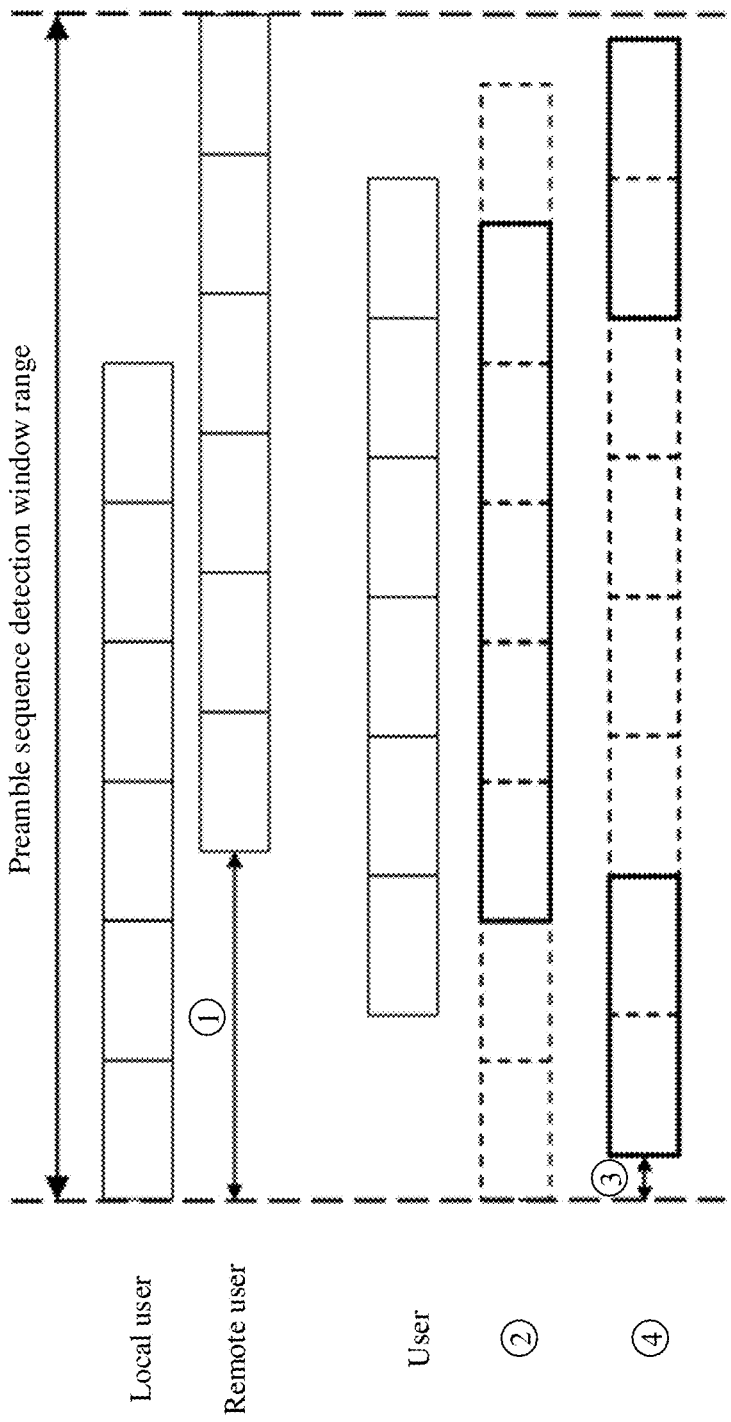
FIG. 4 is a schematic diagram of a frequency domain enhanced detection method of a random access preamble without a cyclic prefix.

FIG. 4 is a schematic diagram of a frequency domain enhanced detection method of a random access preamble without a cyclic prefix. A network side device detects an uplink timing delay Delay of a random access preamble according to a random access preamble detection method provided in this application. When a maximum round-trip transmission delay difference between users in a cell (or a satellite beam) in a satellite scenario is greater than one preamble symbol, the uplink timing delay Delay of the random access preamble detected by the network side is equal to a sum of an uplink timing delay Delay_f of a fractional quantity of preamble symbols and an uplink timing delay Delay_i of an integer quantity of preamble symbols.

The detection method is specifically described as follows:

Step 1: Detect the uplink timing location Delay_f of the fractional quantity of random access preamble symbols.

Detection of the uplink timing location of the fractional quantity of preamble symbols uses an FFT window (as shown in the bold black box after ② in FIG. 4) in a middle part of a preamble sequence detection window range. This ensures that some symbols of all users enter the FFT window, and ensures that maximum receive gains can be obtained.

Step 2: After Delay_f is obtained, detect the uplink timing location Delay_i of the integer quantity of random access preamble symbols.

An FFT window in this step translates backwards by Delay_i. This ensures that the FFT window is aligned with an edge of a received preamble symbol, thereby reducing inter-symbol interference. Several FFT windows (as shown in the bold black box after ④ in FIG. 4 (FFT windows used for detection of the uplink timing location of the integer quantity of preamble symbols)) in the first part and the last part are used, to determine the timing location Delay_i of the integer quantity of preamble symbols based on related energy in the FFT windows.

Step 3: Add the uplink timing locations Delay_f and Delay_i that are detected in the two steps, to obtain an overall uplink timing delay Delay.

A format of the random access preamble without the cyclic prefix is an added format, and therefore a new sequence configuration method needs to be used, so that the network side device can efficiently notify a terminal of a sequence sending form used in a random access procedure.

This application shows the format of the random access preamble without the cyclic prefix. To avoid inter-symbol interference in uplink timing detection on the network side, the random access preamble sequence without the cyclic prefix cannot be placed from a start location of a PRACH occasion. In this way, it is necessary to determine an offset related to location placement in a specific manner. This application provides a location indication method of the random access preamble without the cyclic prefix.

Figure 5:
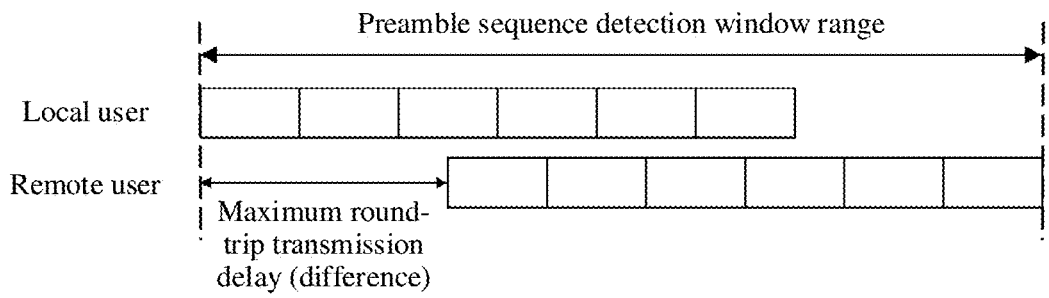
FIG. 5 is a schematic diagram of arrival time of random access preamble sequences of a local user and a remote user in a satellite cell.
Figure 6:
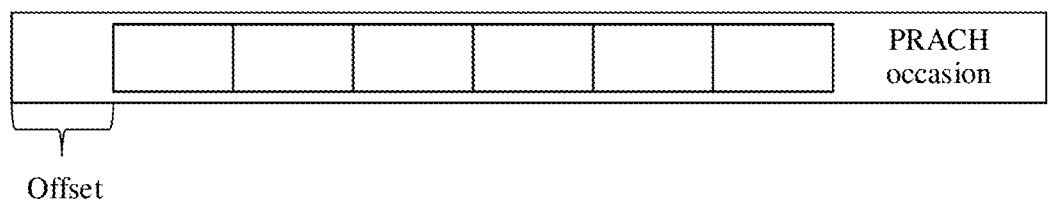
FIG. 6 is a schematic diagram of placing a random access preamble at a physical random access channel PRACH occasion.

FIG. 5 shows time when random access preambles transmitted by a local user and a remote user in a specific satellite cell (or a satellite beam) at a same physical random access channel PRACH occasion arrive at a network side. For the remote user, some data before the random access preamble may enter a detection window range of the random access preamble. If corresponding time of the data is not reserved, inter-symbol interference may occur during uplink timing detection, and a detection result is affected. FIG. 6 is a schematic diagram of placing a random access preamble at a physical random access channel PRACH occasion. To avoid inter-symbol interference generated during uplink timing detection, a length needs to be reserved between the random access preamble and a start location of the PRACH occasion. There is a mapping relationship between the reserved length and an offset related to a placement location of the random access preamble at the PRACH occasion.

Figure 7:
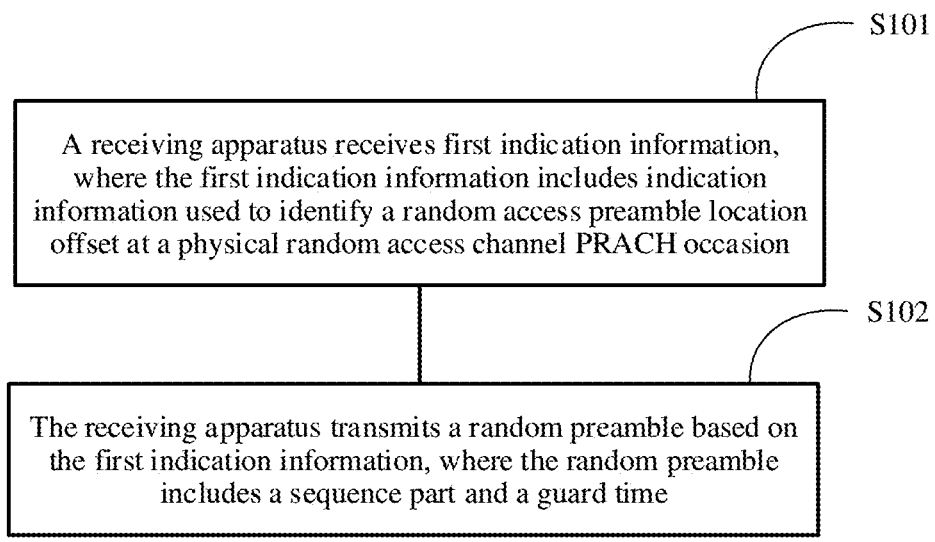
FIG. 7 is a random access preamble configuration method applicable to a satellite network according to this application.

To meet the foregoing requirement, a random access preamble configuration method applicable to a satellite network is provided according to this application and shown in FIG. 7. The method is used to indicate random access preamble location offset information at a physical random access channel PRACH occasion to a terminal device or a terminal communication apparatus. An offset and duration of the PRACH occasion can be flexibly configured based on features of a satellite system. Because a transmission delay difference between users is relatively large in the satellite communication system, time domain resources occupied by the PRACH occasion can be minimized by using this method. In the configuration method, a receiving apparatus is the terminal device or a communication module or a communication chip in the terminal device. For details, refer to the descriptions of the terminal in specific implementations of this application. A sending apparatus is a satellite or a communication module or a communication chip in the satellite. For details, refer to descriptions of a network device in specific implementations of this application.

The method is described as follows:

S101: The receiving apparatus receives first indication information, where the first indication information includes indication information used to identify a random access preamble location offset at the physical random access channel PRACH occasion.

S102: The receiving apparatus transmits a random preamble based on the first indication information, where the random preamble includes a sequence part and a guard time.

In this embodiment, a location offset of a random access preamble placement location at the PRACH occasion may be, as shown in FIG. 6, a difference between a start location of the PRACH occasion and a start location of the random access preamble, a difference between an end location of the PRACH occasion and an end location of the random access preamble, or a location difference between a start/end location of the PRACH occasion and any location of the random access preamble. For subsequent representations, an example in which the offset is equal to the difference between the start location of the PRACH occasion and the start location of the random access preamble sequence is used. An indication method in another case is similar to this example, and may be derived from this indication method.

From a perspective of interaction between a transmit end and a receive end, the method includes: The sending apparatus sends the first indication information, where the first indication information includes the indication information used to identify the random access preamble location offset at the physical random access channel PRACH occasion. The receiving apparatus receives the first indication information sent by the sending apparatus. The receiving apparatus transmits a random preamble sequence based on the first indication information, where the random preamble sequence includes the sequence part and the guard time. The sending apparatus receives the random preamble sequence transmitted by the receiving apparatus.

Optionally, the location offset in step S101 may be selected to be indicated in an agreed manner, or implicitly indicated by using another related parameter. In this manner, a network side and a terminal agree on or derive, in an agreed manner, a placement offset of the preamble sequence at the PRACH occasion, thereby avoiding extra signaling overheads. The offset herein may be a fixed value, may be a value bound to a preamble format, may be a value derived from at least one of time domain related parameters (parameters associated with a PRACH configuration index in Table 3) of the PRACH occasion, or may be a value related to a frequency domain subcarrier width or a frequency domain location of the random access preamble sequence. After obtaining preamble sequence configuration information indicated by the network side, the terminal may obtain a value of the offset by using a defined table or an agreed formula, and place the random access preamble sequence at the PRACH occasion based on the value of the offset.

Optionally, the indication information used to identify the random access preamble location offset at the physical random access channel PRACH occasion may be selected to be indicated in a signaling manner. In this manner, the network side indicates the placement location of the preamble sequence at the PRACH occasion to the terminal in a specific manner. This is more flexible. A first method for indicating the offset in the signaling manner is that the network side indicates the value of the offset to the terminal in a specific manner. The network side may indicate a value in a granularity unit to the terminal. For example, the granularity unit is $T_C$, and the value indicated by the network side to the terminal is 1000. In this case, the start location of the random access preamble sequence is placed $1000T_C$ later than the start location of the PRACH occasion. The network side may choose to directly indicate the value, indicate a value obtained after the value is multiplied by a scaling coefficient, or indicate an index number. The index number and a specific value form a mapping relationship in the defined table or through a function relationship.

Optionally, the receiving apparatus may determine the random access preamble location offset at the PRACH occasion based on the random access configuration information. In step S101, the indication information used to identify the random access preamble location offset at the physical random access channel PRACH occasion includes at least one of the following: an index of a start subframe, a start slot, or a start symbol in which the random access preamble is placed at the PRACH occasion. The index number of the start subframe/slot/symbol may be an absolute index number consistent with an index number of a subframe/slot/symbol of a system, or may be a relative index different from an index of a start subframe, a start slot, or a start symbol of a communication system at the PRACH occasion. For example, the start subframe of the PRACH occasion is the fourth subframe (where a number of a subframe/slot/symbol starts from 0). If the network side indicates the absolute index number to the terminal, an indicated start subframe is 5, and an indicated start symbol is 2, the random access preamble sequence is placed from the second symbol of the fifth subframe, and is one subframe and two symbols later than the start location of the PRACH occasion. If the network side indicates the relative index number to the terminal, an indicated start subframe is 1, and an indicated start symbol is 2, it also indicates that the random access preamble sequence is one subframe and two symbols later than the start location of the PRACH occasion.

For the index of the start subframe/slot/symbol, the network side may choose to directly indicate the value or indicate the index number. The index number and at least one of the index number of the start subframe/slot/symbol form a mapping relationship in the defined table.

Optionally, the indication information used to identify the random access preamble location offset at the physical random access channel PRACH occasion includes parameter information of the satellite network, and the receiving apparatus derives the random access preamble location offset based on the parameter information, where a parameter of the satellite network includes at least one of the following: a maximum round-trip transmission delay difference between users in a satellite cell (or a satellite beam), an angle of the satellite beam, or a radius of the satellite beam. The network side may indicate the random access preamble location offset to the terminal by using a value and a corresponding function relationship, for example, a maximum round-trip transmission delay difference in a current satellite cell (or a satellite beam), or a value such as a beam angle or a beam radius that can be used to calculate the maximum round-trip transmission delay difference. By using the values indicated by the network side, the terminal may derive an offset value by using a mathematical relationship or an agreed formula. The network side may choose to directly indicate the values having a mapping relationship with the offset, indicate a value obtained after the values are multiplied by a scaling coefficient, or indicate an index number, where the index number and at least one of the values having the mapping relationship with the index number form a mapping relationship in the defined table.

Optionally, when the network side indicates the offset or indicates a parameter related to the offset in this manner, at least one of messages such as a broadcast message, a SIB, a radio resource control RRC message, a media access control MAC element, downlink control information DCI, or a MIB may be selected to carry the indicated parameter. When more than one parameter is indicated, indication forms of the parameters may be the same or may be different. Different signaling configurations are used in the parameters. Different messages may be carried in a same message or may be carried in different messages.

Optionally, the indication information used to identify the random access preamble location offset at the physical random access channel PRACH occasion includes indication information of duration of the PRACH occasion, and the receiving apparatus derives the random access preamble location offset based on the duration, where the duration includes at least one of the following: a quantity of duration subframes, a quantity of duration slots, or a quantity of duration symbols of the PRACH occasion.

For example, the network side indicates at least one of a quantity of duration subframes N_dur,sf, a quantity of duration slots N_dur,slot, and a quantity of duration symbols N_dur,sym of the PRACH occasion to the terminal, and calculates the placement offset of the random access preamble sequence at the PRACH occasion in an agreed manner. For example, the network side indicates that the quantity of duration subframes of the PRACH occasion is 2, a length of a sequence part of a random access preamble format is 1 ms, and the random access preamble sequence is placed in the middle of the PRACH occasion based on an agreement. In this case, the random access preamble sequence is 0.5 ms later than the PRACH occasion. For the quantity of duration subframes/slots/symbols, the network side may choose to directly indicate a value or indicate an index number. The index number and at least one of the quantity of duration subframes, the quantity of duration slots, and the quantity of duration symbols form a mapping relationship defined in a table.

It should be noted that a random access configuration table includes a parameter column named PRACH duration $N_{dur}^{RA}$, and the parameter indicates symbol-level duration of the PRACH occasion. When a design of the random access configuration table can meet a requirement for use, the duration of the PRACH occasion can be directly found by obtaining a configuration of prach-ConfigurationIndex. When a design of the random access configuration table cannot meet the requirement for use, the symbol-level duration of the PRACH occasion may also be used as independent transmission signaling. An indication value of the signaling may be a parameter that is independent of and has priority over the PRACH duration $N_{dur}^{RA}$ in the random access configuration table. Alternatively, the indication value of the signaling may be an additional indication parameter based on the PRACH duration $N_{dur}^{RA}$ in the random access configuration table. That is, a sum of the PRACH duration $N_{dur}^{RA}$ and the indicated symbol-level duration is equal to actual duration of the PRACH occasion.

When the network side indicates the duration of the PRACH occasion or a parameter related to the duration of the PRACH occasion in this manner, the network side may select to use at least one of messages such as a broadcast message, a SIB, RRC, a MAC element, DCI, or a MIB to carry the indicated parameter. When more than one parameter is indicated, indication forms of the parameters may be the same or may be different. Different signaling configurations are used in the parameters. Different messages may be carried in a same message or may be carried in different messages.

In the foregoing two methods for indicating the location offset, that is, indicating the location offset and indicating the duration of the PRACH occasion, both the two values or related parameters of the two values may be indicated, or only one of the values or a related parameter of the value may be indicated. When the terminal sends the random access preamble, the duration of the PRACH occasion and the location offset are both necessary parameters. When the network side indicates only one of the parameters to the terminal, another parameter needs to be derived in an agreed manner. If only the offset or the related parameter is indicated, the duration of the PRACH occasion needs to be determined based on the foregoing information. If only the duration of the PRACH occasion is indicated, the location offset needs to be determined based on the foregoing information.

In the location configuration manner of the random access preamble without the cyclic prefix described in this embodiment, it may be equivalently considered that a cyclic shift segment is reserved at the PRACH occasion, and the cyclic shift segment is left empty or is filled with a piece of useless data. The method for indicating the offset by using the random access preamble without the cyclic prefix and the signaling means that the network side can more flexibly configure a length of a cyclic shift based on the features of the satellite system. In addition, the length of the cyclic shift may be much smaller than the maximum round-trip transmission delay difference between the users in the satellite cell (or the satellite beam). For the satellite communication system, because a satellite is far away from the terminal, a relatively large path loss requires that the terminal needs to use a longer random access preamble. In another aspect, a coverage area of the satellite cell (or the satellite beam) is much larger than that of a ground cell, and more users initiate random access. Therefore, time-frequency resources used by the satellite communication system for PRACH transmission are strained. This method for flexibly configuring the offset based on a signaling indication can not only ensure uplink timing detection performance of the network side, but also shortens a length of the PRACH occasion as much as possible, thereby saving time domain resources occupied by the PRACH transmission.

In addition to indicating the random access preamble location offset information at the physical random access channel PRACH occasion, to complete configuration of the random access preamble applicable to the satellite network, this embodiment of this application further provides a method for indicating a format of the random access preamble sequence without the cyclic prefix. Compared with a random access preamble format defined in an existing LTE/NR protocol, the random access preamble without the cyclic prefix has no cyclic prefix part.

Optionally, a method for indicating the format of the random access preamble sequence without the cyclic prefix is to extend a random access preamble format table defined in an existing protocol, use the format of the random access preamble without the cyclic prefix as an independent format, and use an independent random access configuration table.

An index number of the extended preamble format is added based on an index number of a table defined in an (NR) protocol. The random access preamble format table shown in Table 2 is a specific example in which the format of the random access preamble without the cyclic prefix is used as the independent format. A bold preamble format is a preamble format added based on the (NR) protocol. A preamble sequence in the table is generated by using a ZC sequence whose length is 839, and a frequency domain subcarrier spacing is 1.25 kHz or 5 kHz.

TABLE 2

Extended random access preamble format table

| Format | $L_{RA}$ | $\Delta f^{RA}$ | $N_u$ | $N_{CP}^{RA}$ |
| --- | --- | --- | --- | --- |
| 0 | 839 | 1.25 kHz | 24576 · κ | 3168 · κ |
| 1 | 839 | 1.25 kHz | 2 · 24576 · κ | 21024 · κ |
| 2 | 839 | 1.25 kHz | 4 · 24576 · κ | 4688 · κ |
| 3 | 839 | 5 kHz | 4 · 6144 · κ | 3168 · κ |
| 4 | 839 | 1.25 kHz | 24576 · κ | — |
| 5 | 839 | 1.25 kHz | 2 · 24576 · κ | — |
| 6 | 839 | 1.25 kHz | 4 · 24576 · κ | — |
| 7 | 839 | 5 kHz | 4 · 6144 · κ | — |

In the foregoing table, $L_{RA}$ indicates the length of the ZC sequence for generating the preamble sequence, $\Delta f^{RA}$ indicates the frequency domain subcarrier spacing of the preamble sequence, $N_u$ indicates a length of a sequence part, and $N_{CP}^{RA}$ indicates a length of a cyclic prefix. Units of the sequence part and the length of the cyclic prefix are $T_C=1/(\Delta f_{max} \cdot N_f)$, where $\Delta f_{max}=480$ kHz, and $N_f=4096$. κ in the table is a constant whose value is 64.

In this method, a format of a preamble with a cyclic prefix and a format of a preamble without a cyclic prefix are used as two different preamble formats, so that the random access preamble format table defined in the existing protocol is extended, and different format index numbers are used to distinguish between the two preamble formats. Certainly, it may be found from Table 2 that the formats 0 to 3 differ from the formats 4 to 7 only in cyclic prefix lengths. Therefore, the two groups of formats may be reused. Whether a cyclic prefix length is required needs to be determined based on a requirement of a scenario. For example, if scenario indicator bit information flaginfo exists, and flaginfo=1, the formats 0 to 3 have no cyclic prefix; if flaginfo=0, the formats 0 to 3 are configured with cyclic prefix lengths according to Table 2. For another example, a satellite and a communication device of the satellite are configured with random access preamble formats according to Table 2, but a default cyclic prefix length does not exist.

After the random access preamble format table is extended, a random access configuration table needs to be modified and designed accordingly. The random access configuration table is defined in a protocol, and associates a physical random access channel (Physical Random Access Channel, PRACH) configuration index number with a time domain-related parameter of a PRACH occasion (PRACH Occasion), such as a preamble format, a preamble sending periodicity, a time domain placement location, and duration of a preamble sequence. After an added preamble format is defined, because a preamble format index number is added to the random access configuration table, an existing random access configuration table needs to be extended or redesigned.

Optionally, in the random access preamble configuration method that is applicable to the satellite network and that is provided in this application, the first indication information further includes at least one first sequence number, where the first sequence number is used to indicate random access configuration information associated with the random access preamble without the cyclic prefix. The receiving apparatus determines format information of the random access preamble without the cyclic prefix based on the random access configuration information.

associated with the format of the preamble without the cyclic prefix may be redesigned in a form of the random access configuration table defined in the existing protocol. When finding that the terminal accesses the satellite communication system, the terminal should use the random access configuration table associated with the format of the preamble without the cyclic prefix. To avoid an increase of a quantity of indication bits of prach-ConfigurationIndex, the added random access configuration table may use 256 or less configurations.

Optionally, this application further provides a method for indicating a format of a random access preamble sequence without a cyclic prefix. The method is compatible with the random access preamble format table defined in the NR protocol, and uses an independent random access configuration table.

When the maximum round-trip transmission delay difference in the satellite cell (or the satellite beam) is not greater than a maximum sequence part length of a random access preamble format defined in the NR protocol, a sequence part of the random access preamble format defined in the NR protocol may be used as a sequence part of the format of the random access preamble without the cyclic prefix. In this case, the random access preamble format table defined in the existing NR protocol may be used.

The method is the same as that defined in the NR protocol, and prach-ConfigurationIndex in the RACH-ConfigGeneric message of the SIB 1 is used to configure the time domain-related parameter of the PRACH occasion. If the satellite

TABLE 3

Extended random access configuration table

| PRACH configuration index | Preamble format | $n_{SFN}$ mod x = y | | Number of a subframe in which a preamble is placed | Start symbol | Quantity of PRACH slots in a subframe | $N_t^{RA,\,slot}$, a quantity of PRACH occasions in time domain in a PRACH slot | $N_{dur}^{RA}$, PRACH duration |
|---|---|---|---|---|---|---|---|---|
| | | x | y | | | | | |
| 256 | 4 | 16 | 1 | 1 | 0 | — | — | 0 |
| 257 | 4 | 16 | 1 | 4 | 0 | — | — | 0 |
| 258 | 4 | 16 | 1 | 7 | 0 | — | — | 0 |
| 259 | 4 | 16 | 1 | 9 | 0 | — | — | 0 |

Table 3 is a specific extended form of the random access configuration table associated with the random access preamble without the cyclic prefix. Each random access configuration table defined in the NR protocol has 256 rows, and a PRACH configuration index number is 0 to 255. Therefore, a PRACH configuration index of the extended random access configuration table starts from 256, and a time domain-related parameter of a PRACH occasion associated with each PRACH configuration index number is the same as that defined in the NR protocol. In this extension manner, the random access format table and the random access configuration table are modified based on the table specified in the protocol, and a table part specified in the NR protocol is not modified. In another aspect, a PRACH configuration index prach-ConfigurationIndex is configured in a RACH-ConfigGeneric message of a SIB 1, and extending the random access configuration table in this manner increases a quantity of indication bits of the index number.

Generally, a terminal accessing a satellite system knows that the terminal accesses the satellite communication system. Therefore, an added random access configuration table communication system uses the random access preamble sequence without the cyclic prefix by default, when the terminal knows that the terminal accesses the satellite communication system, only the sequence part of the preamble format defined in the NR protocol is used based on a prach-ConfigurationIndex configuration. If the satellite communication system can use both the random access preamble sequence with the cyclic prefix and the random access preamble sequence without the cyclic prefix, a flag bit indicating whether to use the cyclic prefix needs to be added, and a preamble format is selected to be used based on the prach-ConfigurationIndex configuration. Signaling indicating whether to use the cyclic prefix may be carried in a message such as a SIB, RRC, DCI, a MAC element, or a MIB for transmission, and the signaling may be satellite cell-level signaling or satellite beam-level signaling. The following is a specific configuration method of signaling indicating whether to use the cyclic prefix. When NoCP-Flag is enabled, only the sequence part of the preamble format defined in the NR protocol is used. When NoCP-Flag is disabled, the cyclic prefix and the sequence part of the preamble format defined in the NR protocol are used.

Pseudocode is as follows:

```
-- ASN1START
-- TAG-RACH-CONFIG-GENERIC-START
RACH-ConfigGeneric ::=          SEQUENCE {
    prach-ConfigurationIndex        INTEGER (0..255),
    NoCP-Flag                       BOOL
    ...
}
    -- TAG-RACH-CONFIG-GENERIC-STOP
-- ASN1STOP
```

For a random access configuration table that associates prach-ConfigurationIndex with the time domain-related parameter of the PRACH occasion, a table defined in the NR protocol may be directly used, or the random access configuration table may be extended or redesigned by using the foregoing method based on an actual requirement.

When the maximum round-trip transmission delay difference in the satellite cell (or the satellite beam) is greater than the maximum sequence part length of the random access preamble format defined in the NR protocol, a new random access preamble format needs to be added. In this case, a preamble format with a longer sequence part needs to be added based on the random access preamble format table defined in the NR protocol.

TABLE 4

Extended random access preamble format table

| Format | $L_{RA}$ | $\Delta f^{RA}$ | $N_u$ | $N_{CP}^{RA}$ |
|---|---|---|---|---|
| 0 | 839 | 1.25 kHz | $24576 \cdot \kappa$ | $3168 \cdot \kappa$ |
| 1 | 839 | 1.25 kHz | $2 \cdot 24576 \cdot \kappa$ | $21024 \cdot \kappa$ |
| 2 | 839 | 1.25 kHz | $4 \cdot 24576 \cdot \kappa$ | $4688 \cdot \kappa$ |
| 3 | 839 | 5 kHz | $4 \cdot 6144 \cdot \kappa$ | $3168 \cdot \kappa$ |
| 4 | 839 | 1.25 kHz | $6 \cdot 24576 \cdot \kappa$ | — |
| 5 | 839 | 1.25 kHz | $8 \cdot 24576 \cdot \kappa$ | — |

Table 4 shows a specific form of the extended random access preamble format table in which a longer preamble format is added. A bold preamble format is a preamble format added based on the NR protocol.

Similarly, prach-ConfigurationIndex is used as an index for configuring the time domain-related parameter of the PRACH occasion. Depending on whether the satellite communication system can use both the random access preamble sequence with the cyclic prefix and the random access preamble sequence without the cyclic prefix, an indication bit indicating whether to use the cyclic prefix may need to be added.

Because the random access preamble format is added, for the random access configuration table that associates prach-ConfigurationIndex with the time domain-related parameter of the PRACH occasion, the table defined in the NR protocol may be directly used, or the random access configuration table may be extended or redesigned by using the foregoing method based on an actual requirement.

Because maximum round-trip transmission delay differences between different satellite cells (or satellite beams) are greatly different, quantities of preamble symbols included in sequence parts of used random access preamble formats may be greatly different. To ensure flexibility of preamble format indication, in addition to prach-ConfigurationIndex, signaling that represents a quantity of repeated symbols included in the sequence part and that is independent or based on a table parameter is indicated. The signaling and prach-ConfigurationIndex may be carried in a same message, or may be carried in different messages, and may be selectively carried in at least one of messages such as a SIB, RRC, DCI, a MAC element, or a MIB for transmission.

Based on the foregoing analysis, optionally, in the random access preamble configuration method that is applicable to the satellite network and that is provided in this application, the first indication information further includes indication information used to identify the quantity of repeated symbols included in the sequence part; or the receiving apparatus receives second indication information, where the second indication information includes the indication information used to identify the quantity of repeated symbols included in the sequence part.

The following is a specific example in which the signaling indicating the quantity of repeated symbols and prach-ConfigurationIndex are carried in a same message for transmission. Assuming that prach-ConfigurationIndex is 0 and the random access configuration table defined in the NR protocol is used, the random access preamble format defined in the NR protocol and indicated by configuration signaling includes one preamble symbol, and an indication value of SEQ-Repetition-Num is 6. If the signaling indicating the quantity of repeated symbols is independent, it indicates that the sequence part of the preamble format includes six preamble symbols. If the signaling indicating the quantity of repeated symbols is based on the table parameter, the sequence part of the preamble format includes 7 preamble symbols.

Pseudocode is as follows:

```
RACH-ConfigGeneric ::=          SEQUENCE {
    prach-ConfigurationIndex        INTEGER (0..255),
    SEQ-Repetition-Num              INTEGER (0,2..8),
    ...
}
```

In the indication manner of the format of the random access preamble without the cyclic prefix provided in this embodiment of this application, application requirements of different scenarios are considered, the table defined in the existing communication protocol and the indication manner are comprehensively considered, and the existing communication protocol is changed as little as possible. Therefore, the indication manner is better compatible with the existing protocol (for example, NR), and the indication manner ensures flexibility of a satellite communication system indication method.

After the method for indicating the format of the random access preamble sequence without the cyclic prefix is described, this application further provides a method for designing an enhanced format of a random access preamble without a cyclic prefix, and specifically provides a design pattern (pattern) of a sequence part in the preamble format.

Considering a feature that a communication distance between a terminal and a network side is relatively long in a satellite communication scenario, a random access preamble needs to resist impact caused by both a delay and a path loss. Therefore, a random access preamble format used in some scenarios needs to include a specific quantity of preamble symbols to compensate for the path loss. If an uplink timing length corresponding to a round-trip transmission delay (difference) is represented by a quantity of preamble symbols, and referring to the frequency domain enhanced detection method shown in FIG. 4, it may be found that during detection, a timing length of a fractional quantity of preamble symbols is first estimated, and a timing length of an integer quantity of preamble symbols is then estimated. During detection, a symbol in a middle part of a sequence part is used to estimate the timing length of the fractional quantity of preamble symbols, and a symbol at both ends is used to estimate the timing length of the integer quantity of preamble symbols. When the sequence part is relatively long, most symbols are used to detect the timing length of the fractional quantity of preamble symbols, and performance of detecting the timing length of the fractional quantity of preamble symbols is much better than performance of detecting the timing length of the integer quantity of preamble symbols. Therefore, final detection performance is restricted by the performance of detecting the timing length of the integer quantity of preamble symbols. FIG. 3 is a schematic diagram of a format of a random access preamble without a cyclic prefix. Based on an LTE/NR protocol definition, by default, preamble symbols of a sequence part of the random access preamble without the cyclic prefix are repeated. That is, all preamble symbols are generated by using ZC sequences with a same root sequence number. To balance the performance of detecting the timing length of the fractional quantity of preamble symbols and the performance of detecting the timing length of the integer quantity of preamble symbols, a feasible solution is to introduce another symbol into the random access preamble format, and use a corresponding detection method to improve overall detection performance.

In a subsequent description, a preamble symbol used by default in an existing protocol is referred to as a first symbol, and a symbol that is different from the first symbol and that is introduced to improve long-delay detection performance is referred to as a second symbol. In addition, several same symbols that are consecutively placed are referred to as one symbol group. It may be understood that the foregoing two different symbols are an implementation of this application. In another implementation, there may be a plurality of symbols, for example, four symbols, and the plurality of symbols may be directly named as a first symbol, a second symbol, a third symbol, a fourth symbol, and the like. In another implementation, one or more other symbols different from a first symbol may be collectively referred to as a second symbol. For simplicity of description, this application uses the first symbol and the second symbol as an example for description, but it does not mean that there are only two symbols.

In this design, a random access preamble without a cyclic prefix includes a sequence part, and a sequence part of an enhanced format of the random access preamble may include several first symbol groups and second symbol groups. For example, the sequence part includes at least one first symbol group and at least one second symbol group. The first symbol group includes at least one same first symbol, the second symbol group includes at least one same second symbol, and the first symbol is different from the second symbol. More specifically, a generation sequence of the first symbol is different from that of the second symbol, and the first symbol group and the second symbol group are alternately placed in the sequence part. Specifically, each first symbol group includes at least one consecutively placed first symbol, and each second symbol group includes at least one consecutively placed second symbol. The two types of preamble symbols are different. Quantities of preamble symbols included in each of the symbol groups may be the same or may be different.

Optionally, when one first symbol group in the sequence part is not a symbol group at both ends of the sequence part, the first symbol group includes at least two same first symbols, or when one second symbol group in the sequence part is not a symbol group at both ends of the sequence part, the second symbol group includes at least two same second symbols. Preferably, a quantity of preamble symbols between adjacent first symbol groups or adjacent second symbol groups in the sequence part is greater than or equal to a first threshold. The first threshold is determined based on a maximum round-trip transmission delay in a satellite beam or a satellite cell, or is determined based on a maximum round-trip transmission delay difference in a satellite beam or a satellite cell.

Further, to improve detection performance, when a first symbol group is neither the $1^{st}$ symbol group nor the last symbol group of the sequence part, the first symbol group is required to include at least two consecutive preamble symbols. When all first symbol groups include a same quantity of preamble symbols, or all second symbol groups include a same quantity of preamble symbols, all of the first symbol groups include at least two consecutive preamble symbols (where this requirement needs to be met when the first symbol group is neither the $1^{st}$ symbol group nor the last symbol group of the sequence part). An interval between the adjacent second symbol groups is at least greater than or equal to a quantity of preamble symbols corresponding to the maximum round-trip transmission delay (difference), that is, a difference between start preamble symbol index numbers of the two adjacent second symbol groups is greater than or equal to the quantity of preamble symbols corresponding to the round-trip transmission delay (difference).

It is assumed that the first symbol is generated by using a ZC sequence whose root sequence number is u, and the second symbol is another preamble symbol different from the first symbol. The second symbol may be generated by using a ZC sequence having another root sequence number or generated by using another type of sequence (for example, a pseudo-random sequence). Alternatively, data of the second symbol is set to be all-zero.

Figure 8:
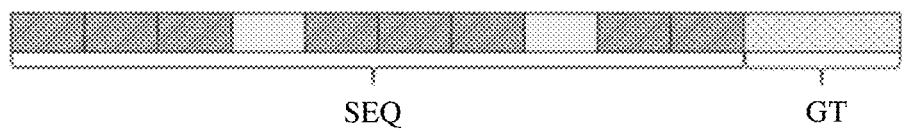
FIG. 8 is a schematic diagram of an enhanced format of a random access preamble without a cyclic prefix that includes two symbols: a first symbol and a second symbol.

For ease of understanding, a specific example of an enhanced format of a random access preamble without a cyclic prefix is as follows: FIG. 8 shows an enhanced format of a random access preamble without a cyclic prefix that includes two symbols: a first symbol and a second symbol. A sequence part of the format of the preamble sequence shown in FIG. 8 includes 10 preamble symbols, and symbol indexes are successively denoted as 0 to 9. The $3^{rd}$ symbol and the $7^{th}$ symbol of the sequence part are set to be all-zero, and the remaining symbols are generated by using the ZC sequence whose root sequence number is u. Herein, the sequence part has three first symbol groups in total. The $1^{st}$ first symbol group includes symbols 0, 1, and 2, the $2^{nd}$ first symbol group includes symbols 4, 5, and 6, and the $3^{rd}$ first symbol group includes symbols 8 and 9. Each of the first symbol groups includes at least two consecutive preamble symbols. The sequence part has two second symbols (groups) in total. The $1^{st}$ second symbol (group) includes a symbol 3, the $2^{nd}$ symbol (group) includes a symbol 7, and a difference between start preamble symbol index numbers of the two adjacent second symbols (groups) is 4. A random access preamble in this format can withstand a round-trip transmission delay (difference) with a length of at most four preamble symbols.

In another aspect, when detecting a random access preamble, a network side needs to know a format of the preamble sequence, to use a corresponding enhanced receiving algorithm to improve the detection performance. Therefore, the network side needs to notify a terminal in a specific manner of distribution rules of first symbols and second symbols in a used random access preamble.

The network side may notify the terminal of the distribution rules of the first symbols and the second symbols in the random access preamble in a manner of agreement, direct or indirect indication, or implicit indication by using other information. When the network side uses a direct indication method, the network side needs to indicate, to the terminal, a location of each first symbol group and/or second symbol group and a quantity of symbols included in the first symbol group and/or second symbol group. When the network side uses an indirect indication method, the network side may indicate an index number of a distribution index table of the first and second symbols of the random access preamble to the terminal, where the index table represents a mapping relationship between a location of each first symbol group and/or second symbol group, a quantity of symbols included in the first symbol group and/or second symbol group, and the index number. When the network side uses a method of implicit indication by using other information, the terminal derives distribution rules of the first symbol groups and the second symbol groups by using other parameter information. For example, distribution of the second symbol groups is related to a maximum round-trip transmission delay difference in a satellite cell (or a satellite beam). The terminal may derive a distribution interval of the second symbol groups, if the terminal knows a maximum round-trip transmission delay difference in a current satellite cell (or a current satellite beam), a value, such as a beam angle and a beam radius, that can be used to calculate the maximum round-trip transmission delay difference, or a value such as the foregoing offset related to the maximum round-trip transmission delay difference and the duration of the PRACH occasion. In addition, if the network side and the terminal notify, in a manner of agreement or signaling indication, a location of the $1^{st}$ or any second symbol group and a quantity of symbols included in each second symbol group, the distribution rules of the first symbols and the second symbols in the random access preamble may be determined.

Generally, a network device sends second indication information to a terminal device, where the second indication information is used to indicate a pattern (pattern) of a sequence part of a preamble, and the sequence part includes at least one first symbol group and at least one second symbol group. The first symbol group includes at least one same first symbol, the second symbol group includes at least one same second symbol, and the first symbol is different from the second symbol. More specifically, a generation sequence of the first symbol is different from that of the second symbol, and the first symbol group and the second symbol group are alternately placed in the sequence part. The pattern of the sequence part of the preamble includes a quantity and a location of the first symbol group and/or a quantity and a location of the second symbol group.

Preferably, the network device sends an indication index to the terminal device, where the indication index is used to indicate the pattern (pattern) of the sequence part of the preamble.

Further, in an actual application, a regular distribution manner of the first and second symbols is more suitable, that is, all first symbol groups and/or second symbol groups include a same symbol, and adjacent intervals of all first symbol groups and/or second symbol groups are the same. In this case, when the network side uses the direct indication method, the network side needs to indicate, to the terminal, only a start location or any distribution location of the first symbol group/second symbol group that includes a same quantity of symbols, a quantity of symbols included in the first symbol group/second symbol group, and a distribution interval of the symbol groups. When the network side uses the indirect indication, the network side may indicate the index number of the distribution index table of the first and second symbols of the random access preamble to the terminal. The index table represents a mapping relationship between the index number and at least one of a start location (or any location) of the first symbol group/second symbol group, a quantity of symbols included in the first symbol group/second symbol group, and an adjacent distribution interval. For example, Table 5 shows a specific form of an index table. The index table represents the mapping relationships between the index number and the start location of the second symbol group, the quantity of symbols included in the second symbol group, and the adjacent distribution interval. An index number 1 indicates a distribution form of the first and second symbols in the random access preamble format shown in FIG. 8.

TABLE 5

Distribution index table of first and second symbols of random access preamble

| Index number | Start location of a second symbol group | Quantity of symbols included in the second symbol group | Adjacent interval of the second symbol group |
| --- | --- | --- | --- |
| 0 | 3 | 1 | 3 |
| 1 | 3 | 1 | 4 |
| 2 | 3 | 1 | 5 |
| ... | ... | ... | ... |
| N | ... | ... | ... |

When the network side indicates a parameter related to the first and second symbol distribution rules to the terminal, at least one of messages such as a SIB, RRC, a MAC element, DCI, or a MIB may be selected to carry the indicated parameter. When more than one parameter is indicated, indication forms of the parameters may be the same or may be different. Different signaling configurations should be used in the parameters. Different messages may be carried in a same message or may be carried in different messages.

This embodiment introduces the second symbol into the enhanced format of the random access preamble without the cyclic prefix, provides the first and second symbol distribution rules and provides a possible second symbol generation method. By using the random access preamble format generated based on this design method, performance of detecting a timing length of a fractional quantity of preamble symbols and performance of detecting a timing length of an integer quantity of preamble symbols can be balanced, thereby improving overall uplink timing detection performance. This embodiment further provides the first and second symbols distribution indication method, so that indication on the network side is flexible when signaling overheads are minimized.

Figure 9:
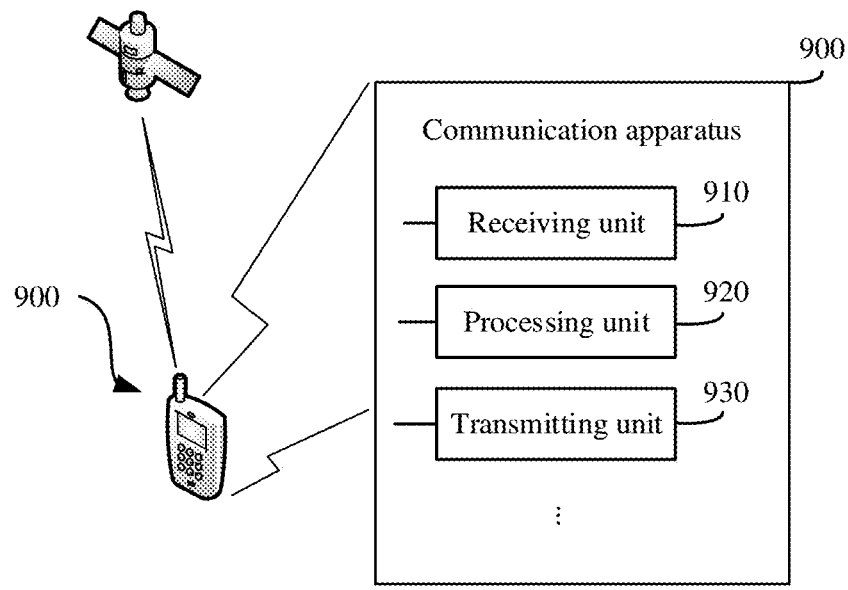
FIG. 9 is a network device 900 according to an embodiment of this application.

Based on a same technical concept as that of the foregoing communication implementation method, as shown in FIG. 9, this application provides a communication apparatus 900. The communication apparatus may be used for satellite communication. The communication apparatus 900 can perform the steps performed by the communication apparatus in the method in FIG. 7. To avoid repetition, details are not described herein again. In a design, the apparatus may include units that are in a one-to-one correspondence with the methods/operations/steps/actions described in FIG. 7. The units may be implemented by a hardware circuit, software, or a combination of a hardware circuit and software. In a design, the communication apparatus 900 may be a communication apparatus, or may be a chip applied to the communication apparatus. The communication apparatus 900 includes a receiving unit 910, a processing unit 920, and a transmitting unit 930. The processing unit 920 may be separately connected to the transmitting unit 930 and the receiving unit 910.

Optionally, the communication apparatus 900 further includes a storage unit 940 (not shown in the figure), configured to store a computer program. More specifically, a memory may be used to perform a function of the storage unit 940, and a specific type of the memory is described below.

For example, the receiving unit 910 is configured to receive first indication information, where the first indication information includes indication information used to identify a random access preamble location offset at a physical random access channel PRACH occasion. More specifically, an antenna, a radio frequency unit, a transceiver, or a combination thereof may be used to perform a function of the receiving unit 910.

The processing unit 920 is configured to output a random preamble based on the first indication information, where the random preamble includes a sequence part and a guard time. More specifically, a processor or a processing chip may be used to perform a function of the processing unit 920, and a specific type of the processor or the processing chip is described below.

The transmitting unit 930 is configured to transmit the random preamble. More specifically, an antenna, a radio frequency unit, a transceiver, or a combination thereof may be used to perform a function of the receiving unit 930.

Figure 10:
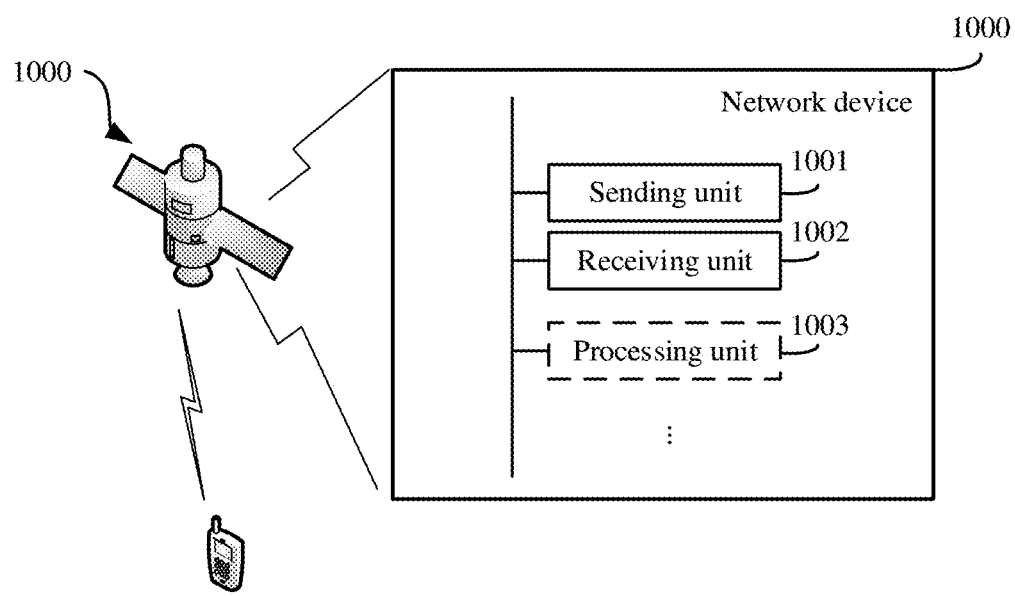
FIG. 10 is a network device 1000 according to an embodiment of this application.

Based on a same technical concept as that of the foregoing communication implementation method, FIG. 10 is a schematic block diagram of a network device 1000 according to an embodiment of this application. The network device may be a satellite, or may be a ground station device in a satellite network. It should be understood that the network device 1000 can perform the steps performed by the satellite in the foregoing method. To avoid repetition, details are not described herein again. In a design, the apparatus may include units that are in a one-to-one correspondence with the methods/operations/steps/actions described in FIG. 7. The units may be implemented by a hardware circuit, software, or a combination of a hardware circuit and software. In a design, the network device 1000 includes a sending unit 1001 and a receiving unit 1002. Optionally, the network device 1000 further includes a processing unit 1003. In specific implementation, the sending unit 1002 and the receiving unit 1002 may be one unit: a transceiver unit.

The sending unit 1001 is configured to send first indication information, where the first indication information includes indication information used to identify a random access preamble location offset at a physical random access channel PRACH occasion. More specifically, an antenna, a radio frequency unit, a transceiver, or a combination thereof may be used to perform a function of the sending unit 1001.

The receiving unit 1002 is configured to receive a random preamble sequence transmitted by a receiving apparatus, where the random preamble sequence includes a sequence part and a guard time. More specifically, an antenna, a radio frequency unit, a transceiver, or a combination thereof may be used to perform a function of the receiving unit 1002.

Optionally, the network device 1000 further includes a processing unit 1003, where the processing unit is configured to decode the received random access preamble. More specifically, a chip pin or a dedicated communication unit may be used to perform a function of the processing unit 1003.

Figure 11:
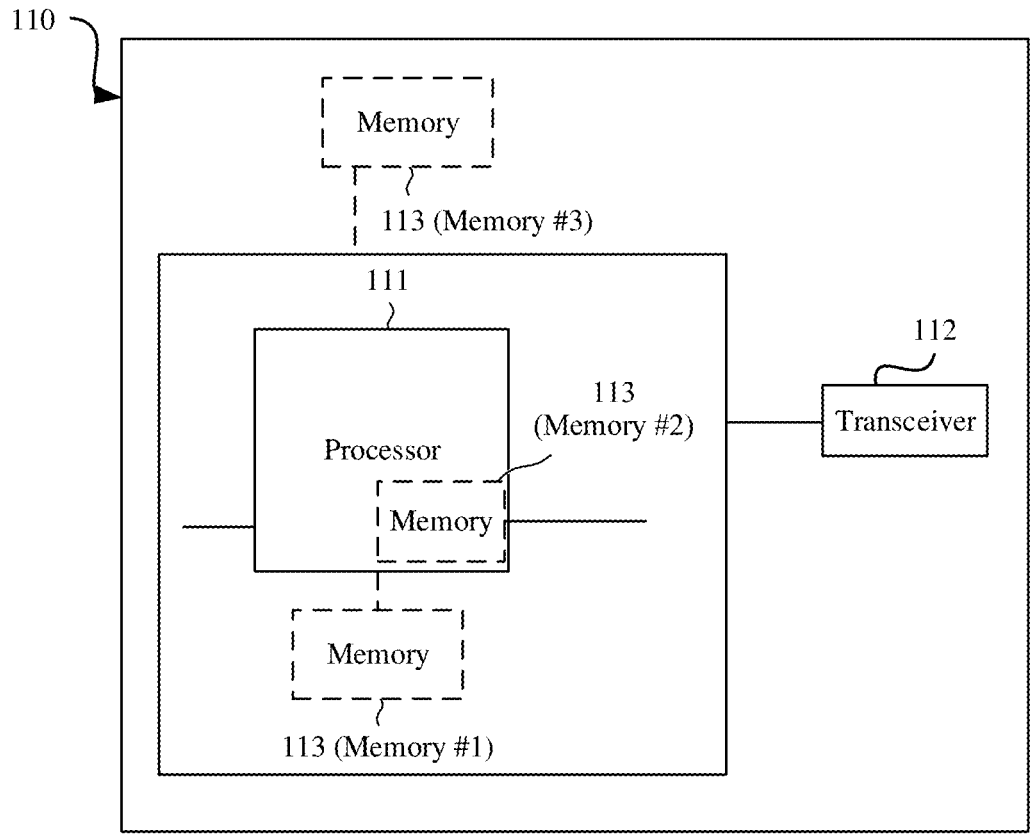
FIG. 11 is a schematic block diagram of a communication apparatus 1100 according to an embodiment of this application.

FIG. 11 is a schematic block diagram of a communication apparatus 110 according to an embodiment of this application. It should be understood that the communication apparatus 110 can perform steps performed by the receiving apparatus or the sending apparatus in the method in FIG. 7. To avoid repetition, details are not described herein again. The communication apparatus 110 includes a processor 111 and a memory 113. The processor 111 and the memory 113 are electrically coupled.

The memory 113 is configured to store computer program instructions. Optionally, the memory 113 (a memory #1) is located in the apparatus, the memory 113 (a memory #2) is integrated with the processor 111, or the memory 113 (a memory #3) is located outside the apparatus.

The processor 111 is configured to execute some or all of the computer program instructions in the memory. When the some or all of the computer program instructions are executed, the apparatus is enabled to perform the method described in any one of the foregoing embodiments.

Optionally, the communication apparatus 110 further includes a transceiver 112, configured to communicate with another device.

It should be understood that the communication apparatus 110 shown in FIG. 11 may be a chip or a circuit, for example, a chip or a circuit that may be disposed in the receiving apparatus or the sending apparatus. The transceiver 112 may alternatively be a communication interface. The transceiver includes a receiver and a transmitter. Further, the communication apparatus 110 may further include a bus system.

The processor 111, the memory 113, and the transceiver 112 are connected through the bus system. The processor 111 is configured to execute the instructions stored in the memory 113, to control the transceiver to receive a signal and send a signal, to complete the steps performed by the receiving apparatus or the sending apparatus in the implementation method in this application. The memory 113 may be integrated into the processor 111, or may be disposed separately from the processor 111.

In an implementation, it may be considered that a function of the transceiver 112 is implemented by using a transceiver circuit or a dedicated transceiver chip. It may be considered that the processor 111 is implemented by using a dedicated processing chip, a processing circuit, a processor, or a general-purpose chip. The processor may be a central processing unit (central processing unit, CPU), a network processor (network processor, NP), or a combination of a CPU and an NP. The processor may further include a hardware chip or another general-purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable gate array (field programmable gate array, FPGA), a generic array logic (generic array logic, GAL) and another programmable logic device, a discrete gate or a transistor logic device, a discrete hardware component, or the like, or any combination thereof. The general-purpose processor may be a microprocessor, or the processor may be any conventional processor or the like.

It should be further understood that the memory in this embodiment of this application may be a volatile memory or a non-volatile memory, or may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application is intended to include but is not limited to these memories and any other memory of a suitable type.

An embodiment of this application provides a computer storage medium. The computer storage medium stores a computer program, and the computer program is configured to perform the foregoing method.

An embodiment of this application provides a computer program product including instructions. When the computer program product is run on a computer, the computer is enabled to perform the foregoing provided method.

Figure 12:
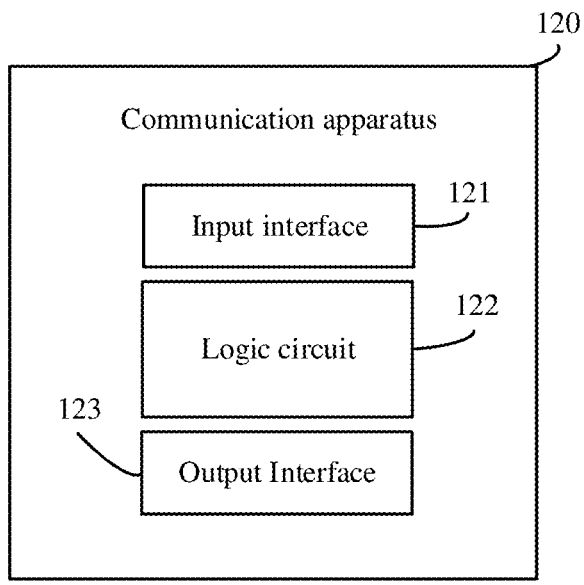
FIG. 12 is a communication apparatus 120 according to an embodiment of this application.

FIG. 12 is a communication apparatus 130 according to an embodiment of this application. The communication apparatus 120 may be configured to perform the foregoing random access preamble configuration method applicable to the satellite network and the specific embodiments. The apparatus may be a communication device or a chip in a communication device. As shown in FIG. 12, the apparatus includes: at least one input (Input(s)) interface 121, a logic circuit 122, and at least one output (Output(s)) interface 123.

The input interface 121 is configured to receive first indication information, where the first indication information includes indication information used to identify a random access preamble location offset at a physical random access channel PRACH occasion.

The logic circuit 122 is configured to calculate a random preamble based on the first indication information, where the random preamble includes a sequence part and a guard time.

The output interface 123 is configured to output a configuration status of a neighboring cell.

Optionally, the logic circuit 122 may be a chip, an encoder, an encoding circuit, or another integrated circuit that can implement the method in this application.

Because the specific methods and embodiments have been described above, the apparatus 120 is only configured to perform the random access preamble configuration method applicable to the satellite network. For specific descriptions of the configuration method, and in particular, a function of the input interface 121, a function of the logic circuit 122, or a function of the output interface 123, refer to related parts in corresponding embodiments. Details are not described herein again.

Figure 13:
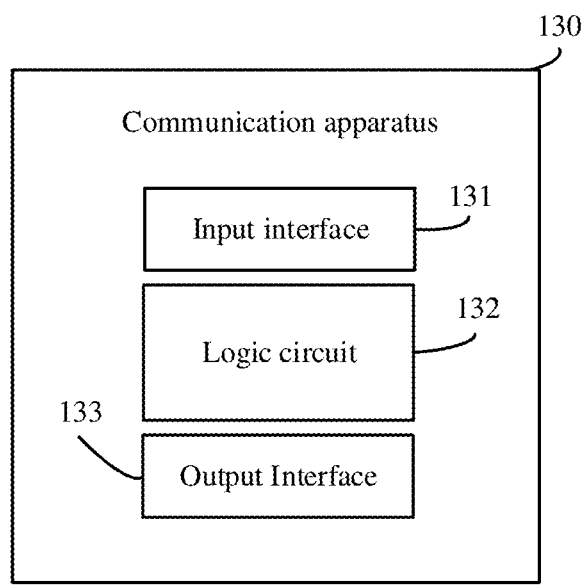
FIG. 13 is a communication apparatus 130 according to an embodiment of this application.

FIG. 13 is a communication apparatus 130 according to an embodiment of this application. The communication apparatus 130 is applicable to a random access preamble configuration method of a satellite network and the specific embodiments. The apparatus may be a satellite or a communication chip in a satellite. As shown in FIG. 13, the apparatus includes: at least one input (Input(s)) interface 131, a logic circuit 132, and at least one output (Output(s)) interface 133.

The output interface 133 is configured to send first indication information, where the first indication information includes indication information used to identify a random access preamble location offset at a physical random access channel PRACH occasion.

The input interface 131 is configured to receive a random preamble sequence transmitted by a receiving apparatus, where the random preamble sequence includes a sequence part and a guard time.

The logic circuit 132 is configured to decode the received random access preamble.

Optionally, the logic circuit 132 may be a chip, an encoder, an encoding circuit, or another integrated circuit that can implement the method in this application.

Because the specific methods and embodiments have been described above, the apparatus 130 is only configured to perform the random access preamble configuration method applicable to the satellite network. For specific descriptions of the configuration method, and in particular, a function of the logic circuit 132 or a function of the output interface 133, refer to related parts in corresponding embodiments. Details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the embodiments provided in this application, it should be understood that the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual communication connections may be implemented through some interfaces. The indirect couplings or communication connections between the apparatuses or units may be implemented in electrical, mechanical, or other forms.

In addition, units in the apparatus embodiments of this application may be integrated into one processing unit, or each of the units may exist alone physically, or two or more units are integrated into one unit.

It may be understood that the processor in the embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The general-purpose processor may be a microprocessor or any conventional processor.

All or some of the methods in the embodiments of this application may be implemented by using software, hardware, firmware, or any combination thereof. When the embodiments are implemented by using the software, all or some of the embodiments may be implemented in a form of a computer program product. The computer program product includes one or more computer programs or instructions. When the computer programs or instructions are loaded and executed on a computer, all or some of the procedures or functions in the embodiments of this application are performed. The computer may be a general-purpose computer, a dedicated computer, a computer network, or another programmable apparatus. The computer programs or instructions may be stored in a computer-readable storage medium, or may be transmitted by using the computer-readable storage medium. The computer-readable storage medium may be any usable medium accessible by a computer, or a data storage device, such as a server, integrating one or more usable media. The usable medium may be a magnetic medium, for example, a floppy disk, a hard disk, or a magnetic tape, or may be an optical medium, for example, a CD-ROM or a DVD, or may be a semiconductor medium, for example, a solid-state drive (solid-state drive, SSD), a random access memory (random access memory, RAM), a read-only memory (read-only memory, ROM), or a register.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

What is claimed is:

1. A random access preamble configuration method applicable to a satellite network, comprising:
   receiving, by a receiving apparatus, first indication information, wherein the first indication information comprises indication information used to identify a random access preamble location offset at a physical random access channel PRACH occasion; and
   transmitting, by the receiving apparatus, a random preamble based on the first indication information, wherein the random preamble comprises a sequence part and a guard time,
   wherein the first indication information further comprises at least one first sequence number, wherein the first sequence number is used to indicate random access configuration information associated with a random access preamble without a cyclic prefix; and
   the receiving apparatus determines format information of the random access preamble without the cyclic prefix based on the random access configuration information.

2. The method according to claim 1, wherein the receiving apparatus receives second indication information, wherein the second indication information comprises indication information used to identify a quantity of repeated symbols comprised in the sequence part.

3. The method according to claim 1, wherein
   the first indication information further comprises indication information used to identify a quantity of repeated symbols comprised in the sequence part.

4. The method according to claim 1, wherein
   the receiving apparatus determines the random access preamble location offset at the PRACH occasion based on the random access configuration information.

5. The method according to claim 1, wherein
   the indication information used to identify the random access preamble location offset at the physical random access channel PRACH occasion comprises at least one of the following: an index of a start subframe, a start slot, or a start symbol in which the random access preamble is placed at the PRACH occasion,
   wherein the index of the start subframe, the start slot, or the start symbol is a relative index different from an index of a start subframe, a start slot, or a start symbol of a communication system, or an absolute index the same as an index of a start subframe, a start slot, or a start symbol of a communication system.

6. The method according to claim 1, wherein
   the indication information used to identify the random access preamble location offset at the physical random access channel PRACH occasion comprises indication information of duration of the PRACH occasion, and
   the receiving apparatus derives the random access preamble location offset based on the duration, wherein the duration comprises at least one of the following: a quantity of duration subframes, a quantity of duration slots, or a quantity of duration symbols of the PRACH occasion.

7. The method according to claim 1, wherein
the indication information used to identify the random access preamble location offset at the physical random access channel PRACH occasion comprises parameter information of the satellite network, and the receiving apparatus derives the random access preamble location offset based on the parameter information, wherein a parameter of the satellite network comprises at least one of the following:
a maximum round-trip transmission delay difference between users in a satellite cell or a satellite beam, an angle of the satellite beam, or a radius of the satellite beam.

8. The method according to claim 1, wherein
the receiving apparatus receives the first indication information or the second indication information in any one of the following manners: a broadcast message, a radio resource control RRC message, downlink control information DCI, or a media access control MAC message.

9. A communication apparatus, comprising a processor and a memory, wherein the processor is electrically coupled to the memory;
the memory is configured to store computer program instructions; and
the processor is configured to execute some or all of the computer program instructions in the memory, and when the some or all of the computer program instructions are executed, the method according to claim 1 is implemented.

10. The communication apparatus according to claim 9, further comprising:
a transceiver, configured to receive a signal and input the signal to the processor, or send a signal processed by the processor.

11. The method according to claim 1, wherein the sequence part and the guard time are not directly next to any cyclic prefix.

12. A communication apparatus, comprising:
a receiving unit, configured to receive first indication information, wherein the first indication information comprises indication information used to identify a random access preamble location offset at a physical random access channel PRACH occasion;
a processing unit, configured to output a random preamble based on the first indication information, wherein the random preamble comprises a sequence part and a guard time; and
a transmitting unit, configured to transmit the random preamble,
wherein the first indication information further comprises at least one first sequence number, wherein the first sequence number is used to indicate random access configuration information associated with a random access preamble without a cyclic prefix; and
the processing unit determines format information of the random access preamble without the cyclic prefix based on the random access configuration information.

13. The apparatus according to claim 12, wherein
the indication information used to identify the random access preamble location offset at the physical random access channel PRACH occasion comprises at least one of the following: an index of a start subframe, a start slot, or a start symbol in which the random access preamble is placed at the PRACH occasion, wherein
the index of the start subframe, the start slot, or the start symbol is a relative index different from an index of a start subframe, a start slot, or a start symbol of a communication system, or an absolute index the same as an index of a start subframe, a start slot, or a start symbol of a communication system.

14. The apparatus according to claim 12, wherein
the indication information used to identify the random access preamble location offset at the physical random access channel PRACH occasion comprises indication information of duration of the PRACH occasion, and the processing unit derives the random access preamble location offset based on the duration, wherein the duration comprises at least one of the following: a quantity of duration subframes, a quantity of duration slots, or a quantity of duration symbols of the PRACH occasion.

15. The apparatus according to claim 12, wherein
the indication information used to identify the random access preamble location offset at the physical random access channel PRACH occasion comprises parameter information of the satellite network, and the processing unit derives the random access preamble location offset based on the parameter information, wherein a parameter of the satellite network comprises at least one of the following:
a maximum round-trip transmission delay difference between users in a satellite cell or a satellite beam, an angle of the satellite beam, or a radius of the satellite beam.

16. The apparatus according to claim 12, wherein
the receiving unit receives the first indication information or the second indication information in any one of the following manners: a broadcast message, a radio resource control RRC message, downlink control information DCI, or a media access control MAC message.

17. The apparatus according to claim 12, wherein
the first indication information further comprises indication information used to identify a quantity of repeated symbols comprised in the sequence part; or
the receiving unit is further configured to receive second indication information, wherein the second indication information comprises indication information used to identify a quantity of repeated symbols comprised in the sequence part.

18. The apparatus according to claim 12, wherein
the processing unit determines the random access preamble location offset at the PRACH occasion based on the random access configuration information.

* * * * *